United States Patent [19]

Kayoun et al.

[11] Patent Number: 4,928,135
[45] Date of Patent: May 22, 1990

[54] MECHANICAL HOLDING DEVICE FOR A FREE-STRUCTURE OPTICAL-FIBER CABLE

[75] Inventors: Pierre Kayoun, Boulogne-Billancourt; Philippe Pouyez, Colombes, both of France

[73] Assignee: Amphenol Socapex, France

[21] Appl. No.: 313,441

[22] Filed: Feb. 22, 1989

[30] Foreign Application Priority Data

Feb. 23, 1988 [FR] France ................. 88 02167

[51] Int. Cl.⁵ .......................... G02B 6/36; G02B 6/44
[52] U.S. Cl. ........................... 350/96.20; 350/96.23
[58] Field of Search ............. 350/96.10, 96.20, 96.23

[56] References Cited

U.S. PATENT DOCUMENTS

| | | | |
|---|---|---|---|
| 4,153,332 | 5/1979 | Longoni | 350/96.23 |
| 4,365,865 | 12/1982 | Stiles | 350/96.23 |
| 4,460,159 | 7/1984 | Charlebois et al. | 350/96.20 X |
| 4,697,873 | 10/1987 | Bouvard et al. | 350/96.23 |
| 4,786,137 | 11/1988 | Cornelison et al. | 350/96.23 |

FOREIGN PATENT DOCUMENTS

| | | |
|---|---|---|
| 3234484 A1 | 3/1984 | Fed. Rep. of Germany. |
| 3414363 A1 | 10/1985 | Fed. Rep. of Germany. |
| 2588387 | 4/1987 | France. |

*Primary Examiner*—William L. Sikes
*Assistant Examiner*—Akm E. Ullah

[57] ABSTRACT

A mechanical holding device (28) for a free-structure optical-fiber cable (10), which cable comprises a substantially cylindrical core (14) surrounded by an outer protective jacket (26). The core is provided with peripheral grooves (16) in which respective optical fibers (18) are freely received. The holding device comprises a retention block (30) molded directly around respective bared portions (14a, 26a) of the core and of the protective jacket, with each optical fiber being accommodated in a respective fiber-passing tube (36), each tube having one end extending beneath the protective jacket, and all of the tubes being molded within said retention block (30).

10 Claims, 1 Drawing Sheet

MECHANICAL HOLDING DEVICE FOR A FREE-STRUCTURE OPTICAL-FIBER CABLE

The present invention relates to a mechanical holding device for a free-structure optical-fiber cable.

BACKGROUND OF THE INVENTION

The ends of optical-fiber cables need to be connected mechanically to other apparatuses, with the optical fibers themselves being connected to optical processing devices received in said other apparatuses.

In order to avoid transmitting the forces which are exerted on the outer jacket of the cable to the fibers themselves, it is common practice to make "free-structure" cables in which the fibers are free relative to the other components of the cable.

Typically, such cables comprise a substantially cylindrical core and an outer protective jacket, the core being provided with helical grooves around its periphery with each groove freely receiving an optical fiber, and optionally being reinforced by a central strength member. A sheath of braiding may optionally be interposed between the core and the jacket.

The assembly is called a free-structure assembly since the optical fibers do not withstand the forces imparted to the mechanical components of the cable since they are freely mounted in the grooves of the core.

However, at the ends of such cables, it is particularly awkward to provide mechanical holding devices which do not interfere with the free structure.

For example, in the assembly shown in French patent application number FR 85 14765, the strength member is locked in a central end fitting and the protective jacket of the cable is clamped by two means which are distinct and interconnected to each other.

Such a solution is far from convenient to implement and its traction strength is relatively limited. The cable begins to slide at about 30 kgf, and the connection breaks at about 70 kgf.

The present invention seeks to provide good quality retention or holding of the cable up to forces of about 150 kgf to 200 kgf, while using means which are simple to implement.

U.S. Pat. No. 4 460 159 discloses a mechanical holding device for a free-structure optical-fiber cable, in which the cable comprises a substantially cylindrical core and an outer protective jacket, the core being provided with peripheral grooves in which optical fibers are freely received, and said holding device comprising a retaining block which is molded directly about the core and the protective jacket over a bared portion of each of them.

SUMMARY OF THE INVENTION

According to the present invention, a holding device of this kind further includes a fiber-passing tube for each optical fiber, one end of each tube extending beneath the protective jacket, and each tube accommodating a respective optical fiber passing freely therealong, with said tubes being molded in said retention block and passing through it.

Thus, since the holding block is molded around the jacket and the core, and also around the strength member, and the braiding, if present, excellent transfer is obtained of mechanical traction forces between these components of the cable and any structure to which the block may be fixed. Further, the freedom of the optical fibers relative to the core is conserved where they pass through the holding block since they pass freely through the tubes molded in the block and extending beneath the jacket of the cable.

BRIEF DESCRIPTION OF THE DRAWING

An embodiment of the invention is described by way of example with reference to the accompanying drawing, in which.

DETAILED DESCRIPTION

Figure 1:
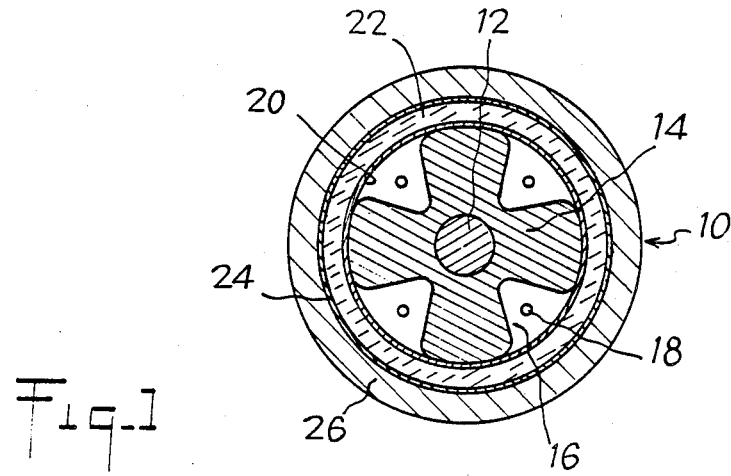
FIG. 1 is a cross-section through a free-structure optical fiber cable.

Going outwards from the center, the optical fiber cable 10 shown in section in FIG. 1 comprises:

a strength member 12 in the form of a flexible rod, and preferably made of resin reinforced with glass fibers or any other mechanically strong synthetic fibers or even metal;

a core 14 which is substantially cylindrical in shape and which surrounds the strength member 12, the periphery of the core being provided with helical grooves 16 at a long pitch, i.e. at a pitch which is several times the diameter of the core; and a plurality of optical fibers 18, each disposed in a respective groove, with the transverse dimensions of the grooves being such that the fibers are received freely therein, i.e. such that the fibers are not subjected to longitudinal or transverse mechanical stresses by the other components of the cable, at least up to some threshold.

The core is surrounded by a first protective tape 20, then by reinforcing braiding 22 which is in turn surrounded by a second protective tape 24, and the assembly is finally encased in a protective jacket 26. The reinforcing braiding is made of a strong material, e.g. an aramide.

Figure 2:
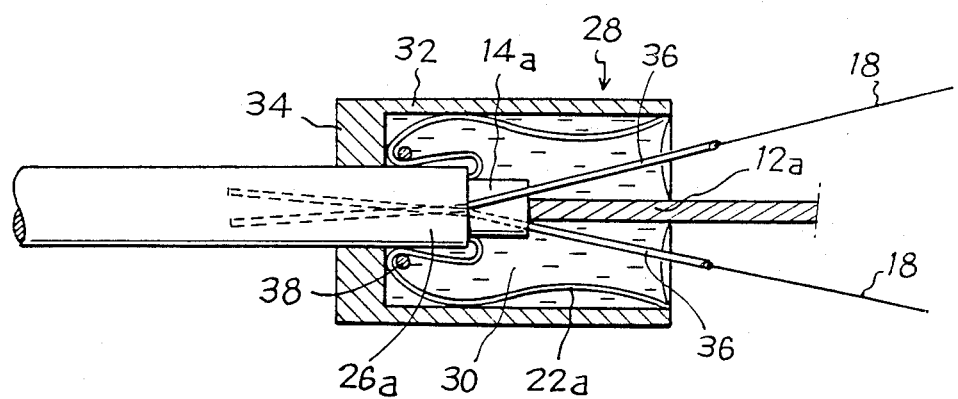
FIG. 2 is a longitudinal section through a holding device in accordance with the present invention and suitable for use with the cable shown in FIG. 1.

With reference to FIG. 2, the cable 10 is shown in side view and is fitted with a holding device 28 in accordance with the present invention and shown in section in the figure.

The device essentially comprises a resin retention block 30 which is molded directly around: the strength member 12; the grooved core 14; the reinforcing braiding 22; and the protective jacket 26; with the resin engaging respective bared zones on each of these parts, namely, in succession: a zone 12a of the strength member; a zone 14a of the core; a length of braid 22a; and a zone 26a of the jacket.

The block 30 is molded inside a mold box 32 which is substantially cylindrical and which is open at one end, and which is closed at its other end by a bottom 34 which is pierced by an orifice allowing the jacket 26 to pass therethrough. This box may include various shapes enabling it to be fixed to a fixed structure, for example it may be threaded, it may have keyways to prevent rotation, and it may have bearing surfaces for sealing rings. By virtue of being molded directly in contact with the various mechanical parts of the cable, the block 30 ensures excellent transmission of mechanical forces between the cable and the fixed structure.

The freedom of the optical fibers relative to the cable is ensured where they pass through the retaining block 30, as follows:

Each optical fiber 18 is accommodated with a small amount of clearance inside a fiber-passing tube 36 going through the block, with each tube being engaged in the end of a corresponding one of the grooves containing the optical fibers, i.e. one end of each tube is inserted beneath the protective jacket and the reinforcing braid, and the tubes are inserted over a sufficient length to ensure that there is no danger of the resin penetrating into the grooves beyond the tubes when the mold box is filled with liquid resin, with the choice of a length with is sufficient taking account of the flexibility of the tubes and the helical pitch of the grooves. The tubes are also long enough to ensure that their opposite ends project beyond the block 30.

Since they pass through the mold box 32, the tubes are consequently likewise molded in the block of resin 30, however the optical fibers pass freely along them so the free mounting of the optical fibers is ensured where they pass through the block.

It may be observed that the reinforcing braiding follows a sinuous path where it is embedded in the block, as follows: starting from the bared end of the jacket, the braiding is initially bent back towards the bottom of the mold box and is then held in place by a resilient ring 38 disposed around the jacket, after which the braiding is folded back towards the open end of the mold box.

The connection to the jacket can be reinforced either by providing an additional device (not shown) for clamping to the jacket in conventional manner, or else by splitting the end 26a of the jacket into a plurality of longitudinal tongues and by folding these tongues to form eye-loops (not shown) which are embedded in the resin. If this is done, the tongues advantageously follow the same sinuous path as the reinforcing braiding.

When necessary, sealing may be provided between the tubes and the optical fibers by means of a suitable gell or viscous liquid, e.g. a silicone-based gell.

One of the advantages of the invention also lies in the fact that after leaving the fiber-passing tubes, the optical fibers are completely free relative to the cable-holding components. In other words, the holding device is sufficiently compact to be clearly disengaged from the fibers and to leave free access to their ends for the purpose of making connections.

We claim:

1. A mechanical holding device for a free-structure optical fiber cable, said cable comprising a substantially cylindrical core and an outer protective jacket, with the core being provided with peripheral grooves in which optical fibers are freely received, said device comprising a retention block which is molded directly about the core and the protective jacket over a bared portion of each of the core and the protective jacket, wherein the device further includes a fiber-passing tube for each optical fiber, one end of each tube extending beneath the protective jacket, and each tube accommodating a respective optical fiber passing freely therealong, each tube being molded in said retention block and passing therethrough, the retention block including shaped portions, suitable for enabling the retention block to be mounted in a fixed structure.

2. A holding device according to claim 1, wherein said retention block is molded in a mold box.

3. A holding device according to claim 1, wherein the retention block is made of resin.

4. A holding device according to claim 1, wherein the tubes are filled with a sealant.

5. A holding device according to claim 1, for use with a cable that also includes a central strength member, wherein the retention block is also directly molded around a bared portion of the central strength member.

6. A device according to claim 1, for use with a cable also including reinforcing braiding interposed between the core and the jacket, wherein the retention block is also directly molded around a bared portion of the reinforcing braiding.

7. A device according to claim 1, wherein an end portion of the jacket is split into a plurality of tongues, which tongues are curved and embedded within the retention block.

8. A device according to claim 1, wherein said shaped portions comprise threaded portions.

9. A device according to claim 1, wherein said shaped portions comprise keyways to prevent rotation.

10. A device according to claim 1, wherein said shaped portions comprise bearing surfaces for sealing rings.

* * * * *